(12) United States Patent　　(10) Patent No.: US 8,504,401 B2
Sivakkolundhu et al.　　(45) Date of Patent: Aug. 6, 2013

(54) ADDRESS REQUEST AND CORRECTION SYSTEM

(75) Inventors: Premanand Sivakkolundhu, Tampa, FL (US); Kenny U. Boatwright, Freeport, NY (US); Maria S. Cabazza, Newark, DE (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 204 days.

(21) Appl. No.: 12/962,858

(22) Filed: Dec. 8, 2010

(65) Prior Publication Data

US 2012/0150896 A1　　Jun. 14, 2012

(51) Int. Cl.
*G06Q 10/00*　　(2012.01)

(52) U.S. Cl.
USPC .................... 705/7.11; 705/7.27; 705/301

(58) Field of Classification Search
None
See application file for complete search history.

(56) References Cited

U.S. PATENT DOCUMENTS

| | | | | |
|---|---|---|---|---|
| 5,659,605 A * | 8/1997 | Voit et al. | ....................... | 379/243 |
| 6,529,722 B1 * | 3/2003 | Heinrich et al. | ........... | 455/404.1 |
| 7,003,489 B1 * | 2/2006 | Dixon et al. | ..................... | 705/38 |
| 7,966,369 B1 * | 6/2011 | Briere et al. | ................... | 709/204 |
| 8,189,568 B2 * | 5/2012 | Qiu et al. | ....................... | 370/352 |
| 8,271,510 B2 * | 9/2012 | Sivakkolundhu et al. | ..... | 707/758 |
| 2002/0022982 A1 * | 2/2002 | Cooperstone et al. | ............ | 705/7 |
| 2002/0138761 A1 * | 9/2002 | Kanemaki et al. | ............ | 713/201 |
| 2003/0225571 A1 * | 12/2003 | Levin et al. | ................... | 704/201 |
| 2004/0260543 A1 * | 12/2004 | Horowitz et al. | ............. | 704/221 |
| 2005/0047577 A1 * | 3/2005 | Timmins | .................. | 379/218.01 |
| 2005/0251331 A1 * | 11/2005 | Kreft | ............................. | 701/207 |
| 2006/0179028 A1 * | 8/2006 | Bram et al. | ..................... | 706/47 |
| 2007/0115935 A1 * | 5/2007 | Qiu et al. | ...................... | 370/352 |
| 2007/0147345 A1 * | 6/2007 | Lowmaster | ................... | 370/352 |
| 2007/0260531 A1 * | 11/2007 | Bezancon | ....................... | 705/28 |
| 2008/0101552 A1 * | 5/2008 | Khan et al. | ...................... | 379/45 |
| 2008/0209435 A1 * | 8/2008 | Dong et al. | ................... | 718/106 |
| 2008/0301016 A1 * | 12/2008 | Durvasula et al. | .............. | 705/35 |
| 2009/0024424 A1 * | 1/2009 | T et al. | ............................. | 705/7 |
| 2010/0074426 A1 * | 3/2010 | Erb | .......................... | 379/201.12 |
| 2011/0033083 A1 * | 2/2011 | Sipe | ............................. | 382/101 |
| 2011/0161334 A1 * | 6/2011 | Sivakkolundhu et al. | .... | 707/758 |

* cited by examiner

*Primary Examiner* — Brett Feeney

(57) ABSTRACT

A system may receive a request to process an address. The system may insert, in a job queue, a first description of a first job for creating a first address when the request is to create a new address. The system may perform subtasks of the first job for creating the first address in a database in accordance with the first description and remove the first job description from the job queue.

18 Claims, 9 Drawing Sheets

ADDRESS REQUEST AND CORRECTION SYSTEM

BACKGROUND INFORMATION

Many types of systems today receive and process customer addresses. For example, an order provisioning system may provide a price list or product description, accept orders from customers, and process orders. In accepting and processing orders, the system may enter customer addresses into one or more working databases.

DETAILED DESCRIPTION OF PREFERRED EMBODIMENTS

The following detailed description refers to the accompanying drawings. The same reference numbers in different drawings may identify the same or similar elements.

Figure 1:
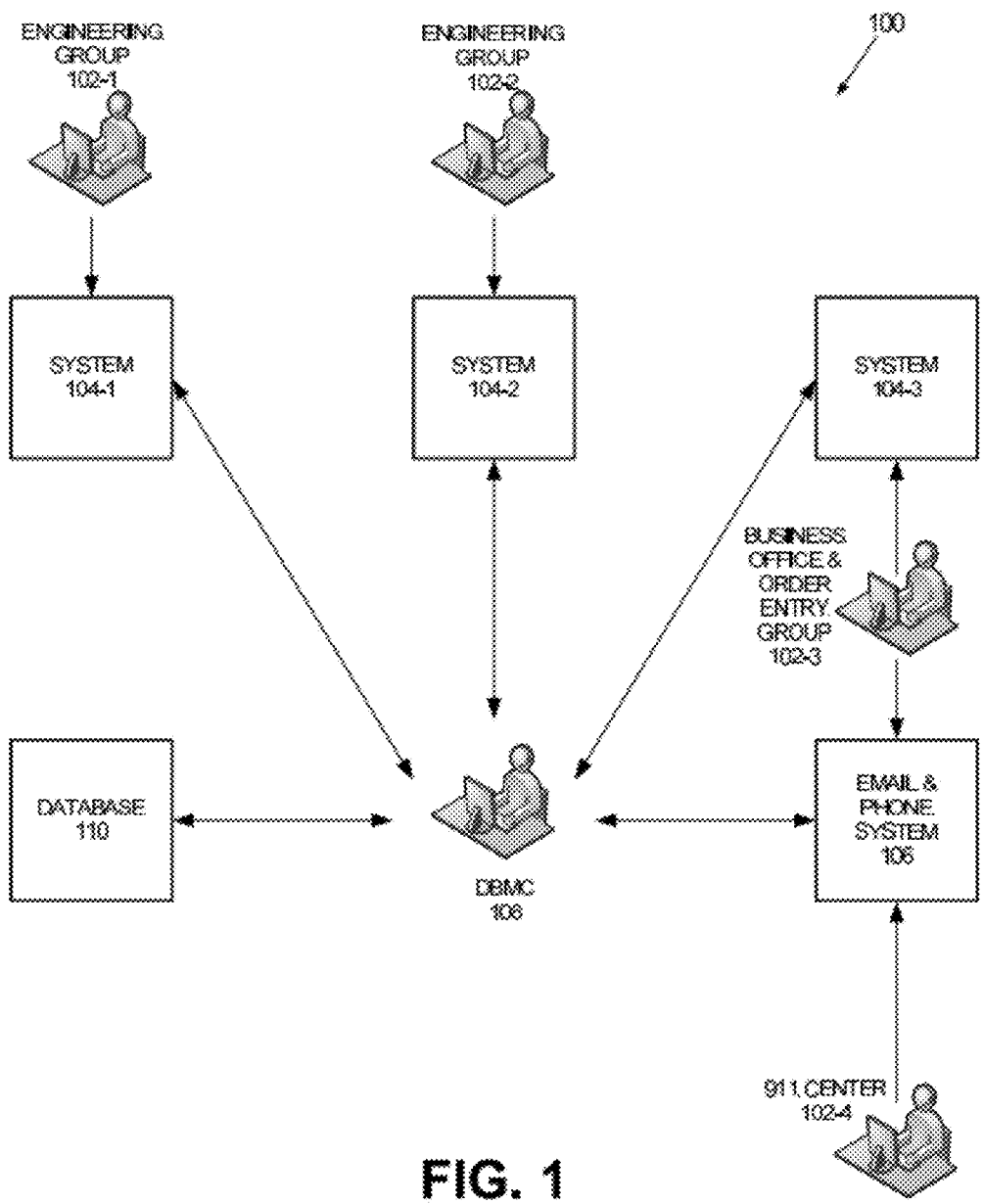
FIG. 1 illustrates exemplary manual processing of addresses.
Figure 2:
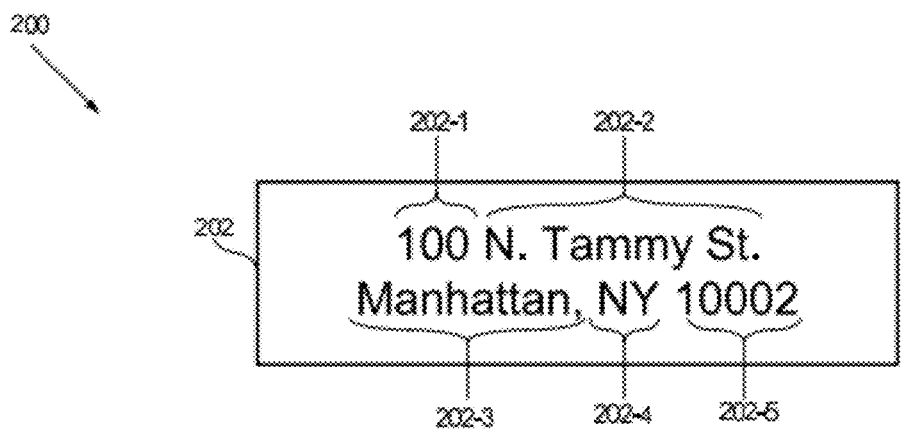
FIG. 2 illustrates an exemplary error associated with processing addresses.
Figure 2:
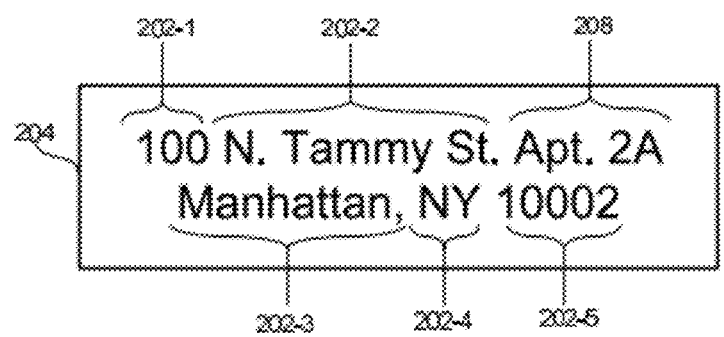
Figure 2:
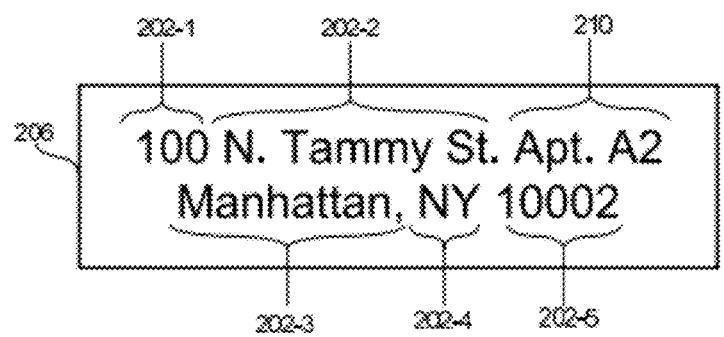
Figure 3:
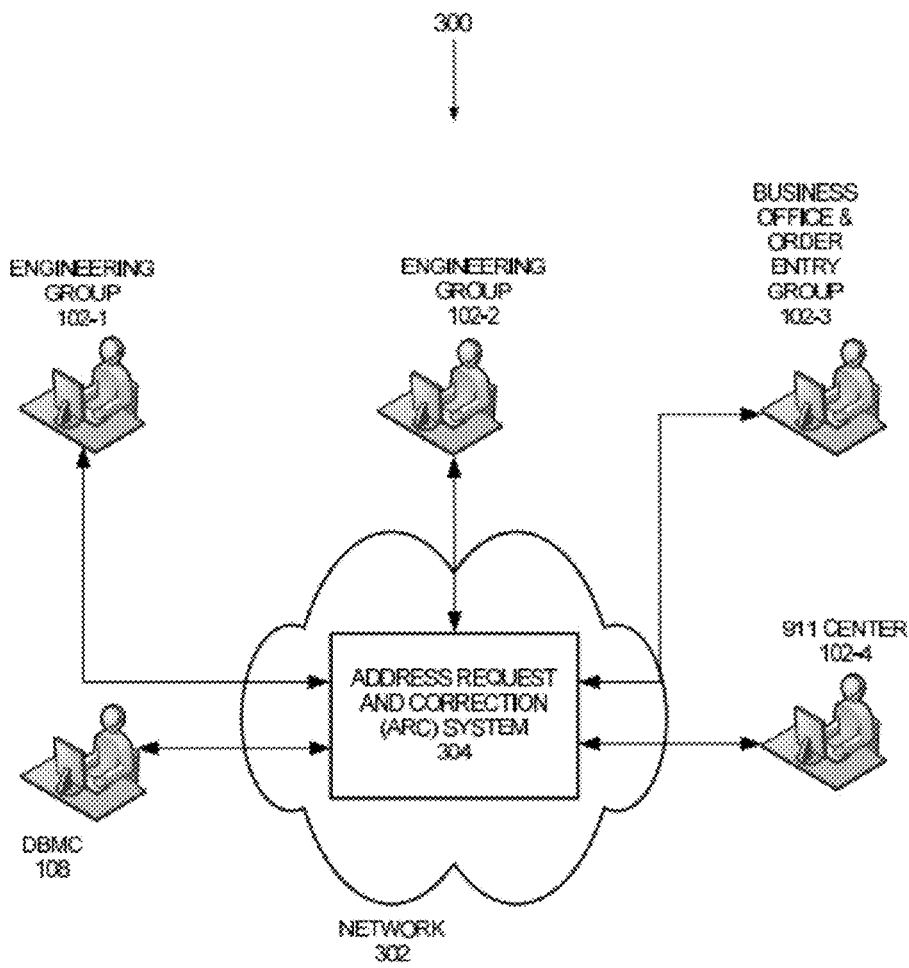
FIG. 3 illustrates an exemplary address request and correction (ARC) system in the environment of FIG. 1.

In the following description, a system may automate receiving and processing customer addresses. FIG. 1 illustrates exemplary manual processing of addresses, including correcting errors that are shown in FIG. 2. FIG. 3 illustrates automating the manual processing illustrated in FIG. 1, by using an address request and correction (ARC) system.

In FIG. 1, as shown, environment 100 may include engineering group 102-1, engineering group 102-2, business office and order entry group 102-3, 911 center 102-4, systems 104-1 through 104-3, email and phone system 106, a database management center 108, and a database 110. Although FIG. 1 shows three groups, four systems, a call center, a database management center and a database, in an actual implementation, environment 100 may include additional or fewer groups, centers, systems, databases, users, operators, administrators, departments, etc.

Engineering groups 102-1 and 102-2 may receive requests to create addresses from database management center 108 via systems 104-1 and 104-2, in accordance with internal and/or external standards and specifications. Upon creating the addresses (e.g., records corresponding to a text or alphanumeric character representing addresses), engineering groups 102-1 and 102-2 may send the addresses via systems 104-1 and 104-2 to database management center 108.

Business office and order entry group 102-3 may receive a customer order. Based on the order, business office and order entry group 102-3 may generate a request to create a record for a new address and forward the request to database management center 108, via either email and phone system 106 or system 104-3 (e.g., web based system).

911 center 102-4 may determine, upon receiving a request from database management center 108, whether a given address is 911-valid (e.g., an address can be physically reached upon receiving a 911 call).

Database management center 108 may coordinate different activities that are related to creating or correcting addresses in database 110. For example, assume that business office and order entry group 102-3 has received a customer order. Based on the customer order, business office and order entry group 102-3 may request database management center 108 to create a new record for a customer address. In response, database management center 108 may send a request to either engineering group 102-1 or engineering group 102-2 for an actual creation of the address in accordance with standards and/or specifications (e.g., depending on the location of the address being requested to be created).

When database management center 108 receives the newly created address from engineering group 102-1/102-2, database management center 108 may route the newly created address to 911 center 102-4, to determine whether the address is 911-valid. If the address is 911-valid or 911-verified, database management center 108 may enter the address in database 110. Otherwise, database management center 108 may attempt to correct the address, by either contacting the engineering group that created the address or business office and order entry group 102-3 that sent the original request for the address.

Database management center 108 may correct many types of errors. FIG. 2 illustrates correcting an exemplary error 200. As shown, error 200 involves a basic address 202 and sub-location addresses 204 and 206. As shown, basic address 202 may include a house number 202-1, street name 202-2, community name 202-3, state name 202-4, and/or zip code 202-5. Each of house number 202-1, street name 202-2, community name 202-3, state name 202-4, and/or zip code 202-5 may correspond to a component of a United States Postal Service (USPS) address.

Sub-location address 204 may include, in addition to components 202-1 through 202-5, a supplemental address 208. Supplemental address 208 may include one or more identifiers (e.g., abbreviations, numbers, etc.) that designate a location (e.g., an apartment, apartment number, suite, etc.) within or associated with an area designated by the corresponding basic address 202. Similarly, sub-location address 206 may include, in addition to components 202-1 through 202-5, a supplemental address 210 that is different from supplemental address 208.

During the lifetime of addresses in database 110, an operator, user, or a system may attempt to create sub-location addresses 204 and 206 that designate the same location. For example, an operator (e.g., a database administrator at database management center 108) may have inadvertently created sub-location address 206 with Apt A2 210, although the operator meant supplemental address Apt. 2A 208 to be the same thing as supplemental address Apt A2 210. If created, one or both of address 204 and address 206 may be associated with an account, causing confusion and errors. In environment 100, when such an error is detected, database management center 108 may need to route requests to create and/or verity the corrected address through different groups 102-1 through 102-3 and/or 911 center 102-4.

FIG. 3 illustrates an exemplary address request and correction (ARC) system 304 in environment 300. ARC system 304 may automate the manual processing illustrated in FIG. 1. As shown in FIG. 3, environment 300 may include network 302, engineering groups 102-1 and 102-2, business office and order entry group 102-3, 911 center 102-4, database management center 108, and ARC system 304. Depending on the implementation, environment 300 may include additional, fewer, or different groups, systems, departments, centers, operators, administrators, databases, etc. than that illustrated in FIG. 3.

Network 302 may include one or more wired and/or wireless networks that are capable of exchanging information, such as voice, video, documents, multimedia, text, etc. and capable of delivering content from one network element to another network element. For example, network 302 may include one or more public switched telephone networks (PSTNs) or another type of switched network. Network 302 may also include a number of transmission towers for receiving wireless signals and forwarding the signals toward the intended destination. Network 302 may further include one or more packet switched networks, such as an Internet protocol (IP) based network, a local area network (LAN), a wide area network (WAN), a personal area network (PAN), an intranet, the Internet, or another type of network that is capable of exchanging information.

As further shown in FIG. 3, network 302 may include address request and correction (ARC) system 304. Engineering groups 102-1 and 102-3, business office and order entry group 102-3, 911 center 102-4, and database management center 108, and ARC system 304 may communicate with one another over network 302.

Engineering groups 102-1 and 102-2 may receive requests to create addresses from ARC system 304, in accordance with internal/external standards and specifications. Engineering groups 102-1 and 102-2 may input a newly created address via a client application that may send the address to ARC system 304.

Business office and order entry group 102-3 may receive a customer order. Based on the order, business office and order entry group 102-3 may generate and send, via a client graphical user interface (GUI), a request to create a record for a new address, to ARC system 304.

911 center 102-4 may verify, upon receiving a request from ARC system 304, to determine whether a given address is 911 valid. Database management center 108 may approve or validate addresses and address-related information that are routed between groups/center 102-1 through 102-4 by ARC system 304.

ARC system 304 may drive a flow of work ("workflow") between engineering groups 102-1 and 102-2, business office and order entry group 102-3, 911 center 102-4, and database management center 108. In contrast to environment 100, in environment 300, ARC system 304 automatically coordinates the work performed by different groups 102-1 through 102-4 and database management center 108.

For example, as in the preceding example for FIG. 1, assume that business office and order entry group 102-3 has received a customer order. Based on the customer order, business office and order entry group 102-3 may request ARC system 304 to create a new record for the customer address. In response, ARC system 304 may forward a request to create the new address to the appropriate engineering group 102-1/102-2. Once the engineering group completes its work, ARC system 304 may forward the newly created address to 911 center 102-4 for 911-validation. When 911 center 102-4 validates/rejects the address, ARC system 304 may route the validated/rejected address to database management center 108 for an approval or to handle an error. Upon receiving the approval, ARC system 304 may build a corresponding United States Postal Service (USPS) address in its database. In this manner, ARC system 304 may drive a workflow for address creation. ARC system 304 may also drive a workflow for address correction and/or other processes that are related to address management.

Figure 4:
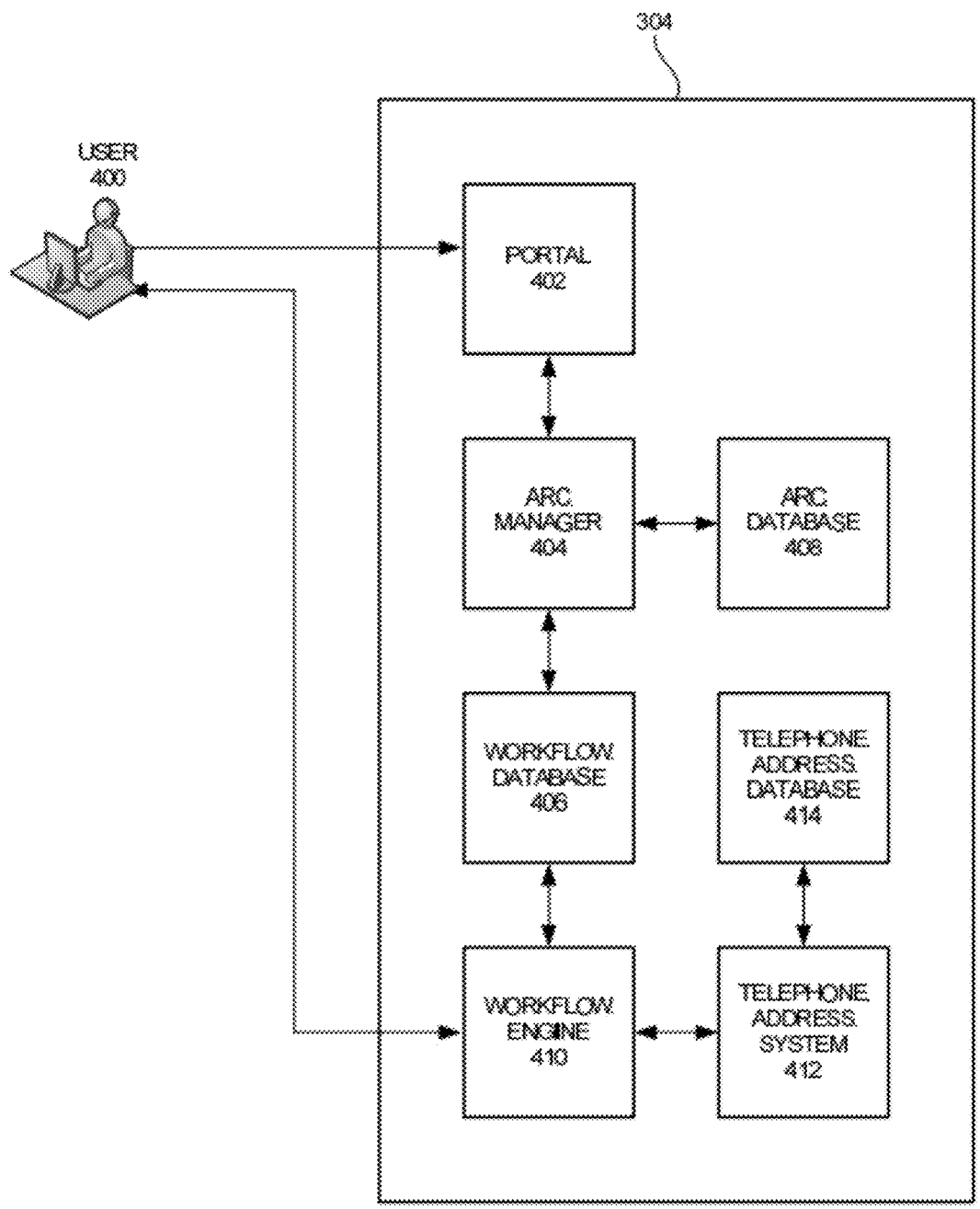
FIG. 4 is a block diagram of exemplary functional components of the ARC system of FIG. 3.

FIG. 4 is a block diagram of exemplary functional components of ARC system 304. As shown, ARC system 304 may include a portal 402, ARC manager 404, workflow database 406, ARC database 408, workflow engine 410, telephone address system 412, and telephone address system database 414. Depending on the implementation, ARC system 304 may include additional, fewer, or different functional components than those illustrated in FIG. 4.

Portal 402 may interact with and relay information (e.g., web information) between a user 400 (e.g., a device or person in engineering group 102-1, engineering group 102-2, 911 center 102, database management center 108, etc.) and ARC manager 404 or workflow engine 410. Through portal 402 interaction, user 400 may send requests to perform different tasks. For example, user 400 (e.g., a super user, system administrator, etc.) may send a request for ARC system 304 to perform system/network administration tasks (e.g., managing user accounts, performing an action that a user is not authorized to perform, etc.). In another example, via portal 402, user 400 (e.g., an engineer) may request ARC manager 404 to create a new address or correct an existing address.

ARC manager 404 may provide address creation and/or correction services as well as retrieve information pertaining to addressees in ARC system 304. In some implementations, ARC manager 104 may also provide support for administrative tasks (e.g., administer user accounts for different groups, perform tasks that individual users are not authorized to perform, etc.).

To create a new address or to correct an address, ARC manager 404 may create a description of a job, with a unique job identifier, based on user input and/or other user related information relayed by portal 402 or other information obtained from ARC database 408. Subsequently, ARC manager 404 may handoff the job description to workflow database 406, where the job description is placed in the active job queue. Each of the jobs may entail receiving or sending an address or its description to one or more users 400 in different groups and/or departments (e.g., engineering group 102-1/102-2, 911 center 102-4, etc.), processing responses from users 400, forwarding the processed replies to other users 400, etc.

Workflow database 406 may receive a job description (e.g., a list of tasks) from ARC manager 404 and store it in an active job queue until the job is performed. ARC database 408 may include records of accounts for users 400. Each user 400 may belong to a group with the authority to perform a set of tasks. User 400 (e.g., a super user, operator, administrator, etc.) may create, remove, and/or configure the user accounts in ARC database 408 via ARC manager 404. ARC database 408 may provide information associated with a particular user (e.g., password) to ARC manager 404, for example, for authentication purposes.

Workflow engine 410 may perform jobs whose descriptions are in the active job queue at workflow database 406. This may entail performing, for each job, subtasks of the job as defined by the job description in the active job queue. In one implementation, workflow engine 410 may poll the active job queue to detect a newly queued job description. Workflow engine may request workflow database 406 to remove the job description from the queue when the job and its subtasks are completed. The job description, with its unique identifier, may be archived or stored in a table in workflow database 406 for tracking purposes.

In driving/performing each of the subtasks of a job, workflow engine 410 may use telephone address system 412. That is, to perform the subtasks associated with creating an address or correcting an existing address, workflow engine 410 may dispatch or delegate one or more requests for performing the subtasks to telephone address system 412.

Telephone address system 412 may create and/or correct addresses in telephone address database 414 upon receiving a request from user 400 (e.g., via portal and ARC manager 404) and/or workflow engine 410. In addition, telephone address system 412 may identify and remove redundant or inconsistent sub-location addresses from the address database (see FIG. 2), and prevent future address inconsistencies or discrepancies by enforcing sub-location address creation standards. In removing an address from telephone address database 414, telephone address system 412 may consult another external system (not shown in FIG. 4) that may depend on existing addresses.

In correcting the discrepancies between sub-location addresses, telephone address system 412 may initially determine whether a sub-location address is associated with a customer account with transaction history (e.g., one or more transactions for the account). If there is no association, telephone address system 412 may remove/delete the sub-location address from telephone address database 414, pending an approval from user 400. If the address is associated with a customer account, telephone address system 412 may attempt to reassign the customer account to a corresponding basic address before removing or deleting the address from telephone address database 414. Telephone address system 412 may provide, to user 400, a list of failed address changes that require an operator/user intervention. Upon the operator/user intervention, telephone address system 412 may commit address changes to telephone address database 414.

In addition to correcting address discrepancies, telephone address system 412 may receive and enforce sub-location address standards. For example, user 400 may specify, via a client interface, ARC manager 404, and/or workflow engine 410, allowable sub-location address formats. Based on the specified formats, telephone address system 412 may allow or deny a sub-location address creation requested through one or more components in ARC system 304.

Telephone address database 414 may include records of basic addresses and sub-location addresses. In some implementations, telephone address database 414 may also include additional information, such as lookup information for customer accounts, customer telephone numbers, etc.

Figure 5:
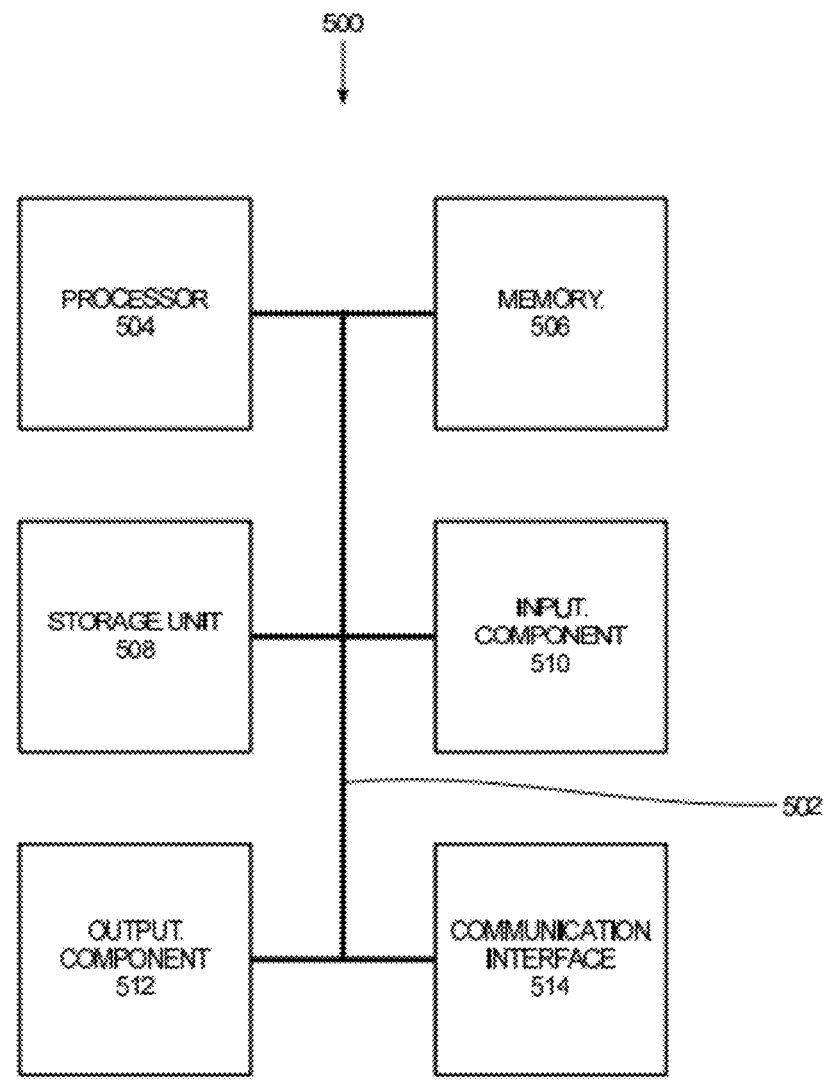
FIG. 5 is a block diagram of exemplary components of a network device of FIG. 3.

FIG. 5 is a block diagram of an exemplary network device 500. Network device 500 may correspond to one or more of devices on which functional components of ARC system 304 may be implemented. Referring to FIG. 5, network device 500 may include bus 502, processor 504, memory 506, storage unit 508, input component 510, output component 512, and communication interface 514. Bus 502 may include a path that permits communication/interaction among the elements of network device 500.

Processor 504 may include one or more processors, microprocessors, or processing logic that may interpret and execute instructions. Memory 506 may include a random access memory (RAM) or another type of dynamic storage device that may store information and instructions for execution by processor 504. Memory 506 may also include a read only memory (ROM) device or another type of static storage device that may store static information and instructions for use by processor 504. Storage unit 508 may include a storage device, such as a solid state drive (SDD), a magnetic and/or optical recording medium (e.g., a hard disk), etc. Depending on the context, the term "memory," "storage," "storage device," and/or "storage unit" may be used interchangeably. For example, a "computer-readable storage device" or "computer-readable medium" may refer to both a memory and/or storage device.

Input component 510 may permit a user to input information to network device 500, such as a keyboard, a keypad, a mouse, a pen, a microphone, a touch screen, voice recognition and/or biometric mechanisms, etc. Output component 512 may output information to the user. Output component 512 may include, for example, a display, a printer, a speaker, etc. In some implementations, because network device 500 may operate as a server device, network device 500 may include a small number of input and output components 510 and 512 (e.g., a keyboard and/or a console), to decrease cost and to increase robustness.

Communication interface 514 may include a transceiver (e.g., a transmitter or receiver) for network device 500 to communicate with other devices and/or systems. For example, via communication interface 514, network device 500 may communicate over a network, such as the Internet, an intranet, a terrestrial wireless network (e.g., a WLAN, WiFi, WiMax, etc.), a satellite-based network, optical network, etc. Communication interface 514 may also include a modem, an Ethernet interface to a LAN, and/or another interface.

Figure 6:
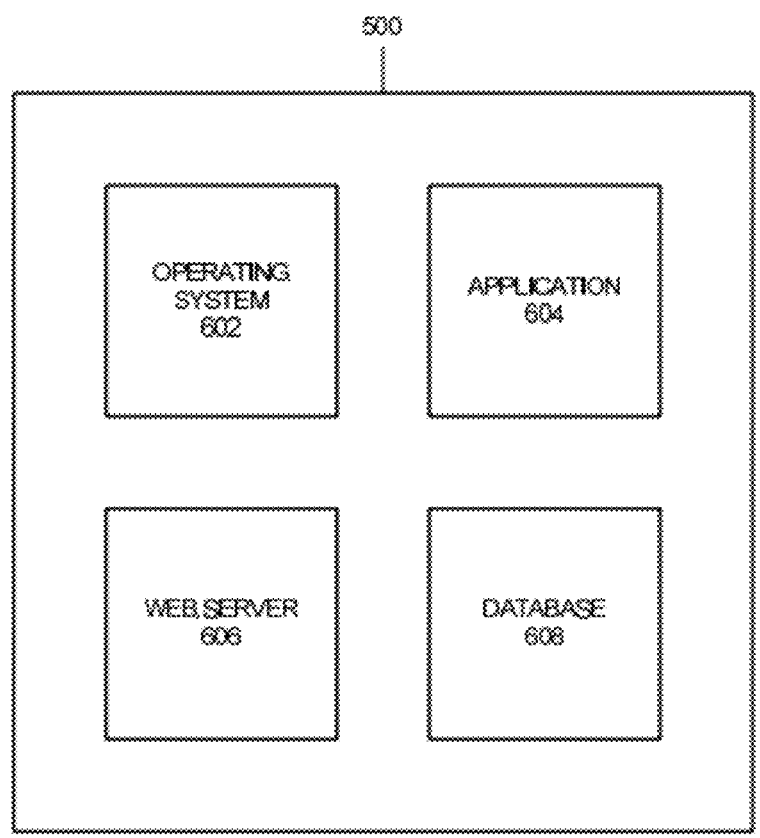
FIG. 6 is a block diagram of exemplary functional components of the network device of FIG. 5.

FIG. 6 is a block diagram illustrating exemplary functional components of network device 500. As shown, network device 500 may include an operating system 602, application 604, web server 606, and database 608. Depending on the implementation, network device 500 may include additional, fewer, or different components than those illustrated in FIG. 6.

Operating system 602 may manage hardware and software resources of network device 500. Operating system 602 may manage, for example, its file system, device drivers, communication resources (e.g., transmission control protocol (TCP)/IP stack), event notifications, etc.

Application 604 may include software program and/or scripts for rendering services. For example, on devices in ARC system 304, application 604 may take the form of one or more programs for address creation, address correction, address management, etc. Other examples of application 604 include a file transfer protocol (FTP) server, an email server, a telnet server, servlets, Java™ machine (JVM), web containers, C# programs, firewall, components to support Authorization, Authentication and Accounting (AAA), and other applications that either interact with client applications or operate in stand-alone mode. In addition, application 604 may include a specialized server program, application server, web page, etc.

Web server 606 may include a software application for exchanging web page related information with one or more browsers and/or client applications. Web server 606 may also provide support for other protocols, such as Simple Object Access Protocol (SOAP), for invoking object methods over a network.

Figure 7:
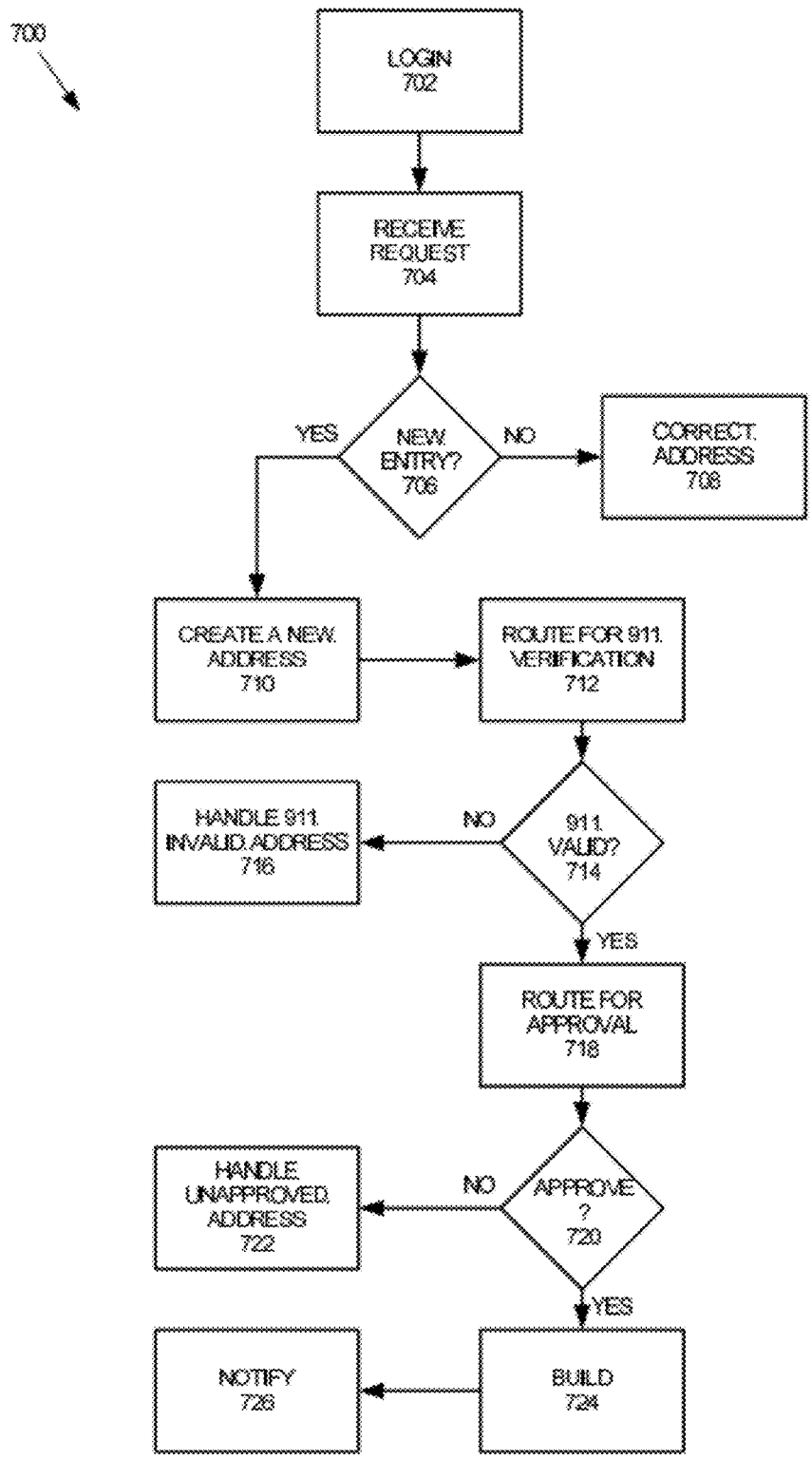
FIG. 7 is a flow diagram of an exemplary process that is associated with the ARC system of FIG. 3.

Database 608 may include records and files and may act as an information repository for network device 500. For example, in ARC database 408, database 608 may store and retrieve user account information pertaining to a particular user. In another example, database 608 in workflow database 406 may implement persistent queues for storing job descrip- FIG. 7 is a flow diagram of an exemplary process 700 that is associated with ARC system 304. Assume that a user (e.g., personnel in business office and order entry group 102-3) starts a client application (e.g., browser) to input an address to ARC system 304. The user may log into ARC system 304 (block 702). In some implementations, the user may log into ARC system 304 through portal 402, and provide information to an authentication challenge at ARC manager 404. Upon receiving a user ID and a password, ARC manager 404 may authenticate the user based on data from ARC database 408.

ARC manager 404 may receive a request that is associated with entering an address (block 704). If the request is not for creating a new existing entry (block 706—NO), ARC manager 404 may create and insert, at the job queue in workflow database 406, a job description that corresponds to a workflow for correcting an address (block 708). In one implementation, in accordance with the job description, workflow engine 410 may submit a request for the correction to telephone address system 412. In response, telephone address system 412 may automatically correct the error (e.g., build a postal alias automatically when the address has a different spelling as a 911 address than as a postal address). When telephone address system 412 responds with a successful/failed correction, workflow engine 410 may record the response from telephone address system 412, and/or notify the user (e.g., via email, pager, voice mail, text, web link, etc.).

If the request is for creating a new entry for the address in ARC system 304 (block 706—YES), ARC manager 404 may create and insert, at the job queue in workflow database 406, a job description that corresponds to a workflow for creating a new address (block 710). In one implementation, in accordance with the job description, workflow engine 410 may notify a group (e.g., engineering group 102-1) to provide a new address in accordance with standards/formats.

Workflow engine 410 may route the new address for a 911 validation (block 712). For example, workflow engine 410 may send the new address (e.g., via a browser, client application, email, etc.) to a user or program at 911 center 102-4. When the user/program at 911 center 102-4 receives the new address, the user/program may indicate (e.g., via a client application/browser for ARC system 304 or another program) whether the new address is 911 valid.

If the address is not 911 valid (block 714—NO), workflow engine 410 may proceed to block 716, to handle a 911 invalid address (block 716). Depending on the implementation, handling the 911 invalid address may include, for example, workflow engine 410 notifying the original user 400 that requested the new address or the group (e.g., engineering group 102-1) that generated the address of the 911 invalid status of the address. If the user or the group provides no further input, workflow engine 410 may terminate the job. If the user/group provides another address, workflow may return to block 704 to process the address.

If the address is 911 valid (block 714—YES), workflow engine 410 may route the 911 valid address to another group (e.g., database management center 108) for an approval (block 718). If the 911 valid address is not approved (e.g., database management center 108 does not approve the address) (block 720—NO), workflow engine 410 may proceed to block 722 for handling the unapproved, 911 valid address (block 722). Depending on the implementation, handling the unapproved address may include, for example, workflow engine 410 notifying the original user 400 that requested the new address or the group that generated the address. If the user/group provides no further input, workflow engine 410 may terminate the job. If the user/group provides another address, workflow may handle the new entry by returning to block 704.

If the 911 valid address is approved (block 720—YES), workflow engine 410 may submit the input address to telephone address system 412. In response, telephone address system 412 may automatically build the address in its telephone address database 414 (block 724). Subsequently, workflow engine 410 may notify the original user 400/group whether the address has been created (block 728), remove the job associated with the address creation from the job queue in workflow database 406, create a record for the job, and/or perform other bookkeeping activities that are associated with the job.

In some instances, in process 700, an original user may not only request a single address, but a range of addresses. ARC manager 404 and workflow engine 410 may treat theses addresses similarly as a single address. For example, upon receiving an approval from the database management center (block 724), telephone address system 412 may build the range of addresses. There is no need for the users to type addresses multiple times.

Figure 8:
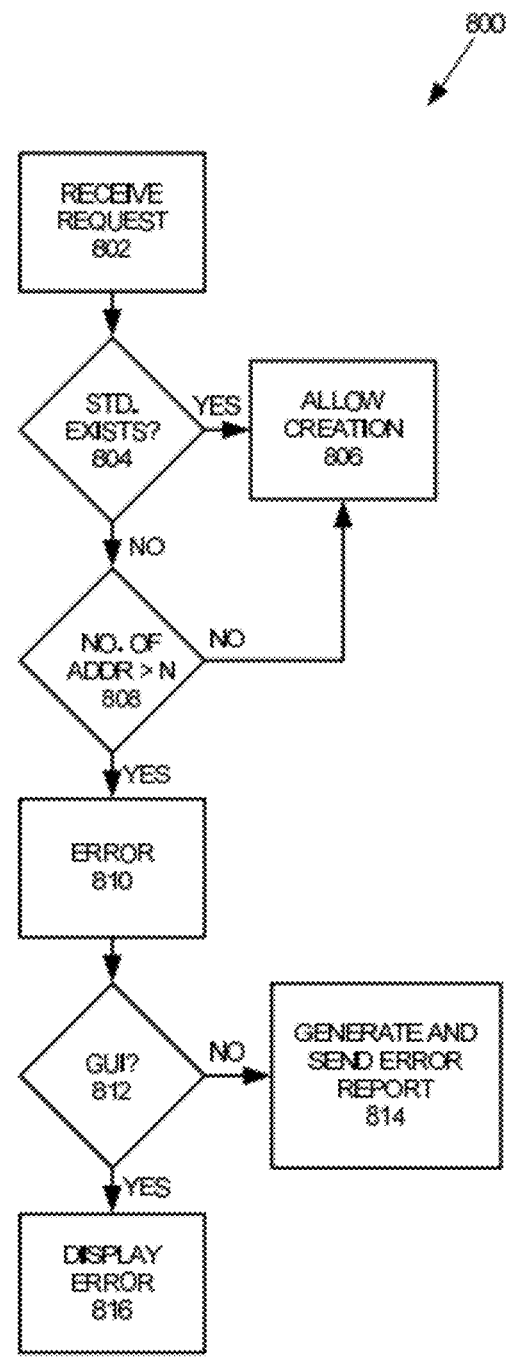
FIG. 8 is a flow diagram of an exemplary process that is associated with enforcing sub-location address standards.

FIG. 8 is a flow diagram of an exemplary process 800 for enforcing sub-location address standards via ARC system 304. In one implementation, logic for such enforcement may be implemented in telephone address system 412. However, ARC system 304 may make available some of the logic in telephone address system 412 available to users via a user interface (e.g., web interface) through portal 402, ARC manager 404, and/or workflow engine 410.

Process 800 may start when telephone address system 412 receives a request to create a sub-location address (block 802). Upon receipt of the request (e.g., from a user over portal 402, ARC manager 404, and/or workflow engine 410), telephone address system 412 may determine whether a standard (e.g., a format) for the sub-location address already exists (block 804). For example, telephone address system 412 may determine whether there is a format (e.g., what supplemental address is allowed, what alphanumeric characters can be used for forming a supplemental address, etc.) for the sub-location address that is being requested to be created. If so, telephone address system 412 may allow the creation of the sub-location address in accordance with the existing standard (block 806).

If there is no standard (block 804—NO), telephone address system 412 may determine whether the number of sub-location addresses that are to be created exceeds a threshold N (e.g., 10) (block 808). If the number of sub-location addresses does not exceed threshold N (block 808—NO), telephone address system 412 may proceed to block 806. Otherwise, (block 808—YES), telephone address system 412 may generate an error (block 810).

If the attempted creation of the sub-location address was via a GUI (e.g., browser) (block 812 YES), telephone address system 412 may notify the user at the GUI via ARC manager 404 and/or portal 402 (block 816). Otherwise, telephone address system 412 may determine that creating the sub-location address was initiated through another program, such as a program for auto-creating an address based on an order (e.g., ordering a particular telephone number). In such an instance, telephone address system 412 may generate and relay a report including a description of the error to a user or an operator via ARC manager 404 and/or portal 402.

Figure 9:
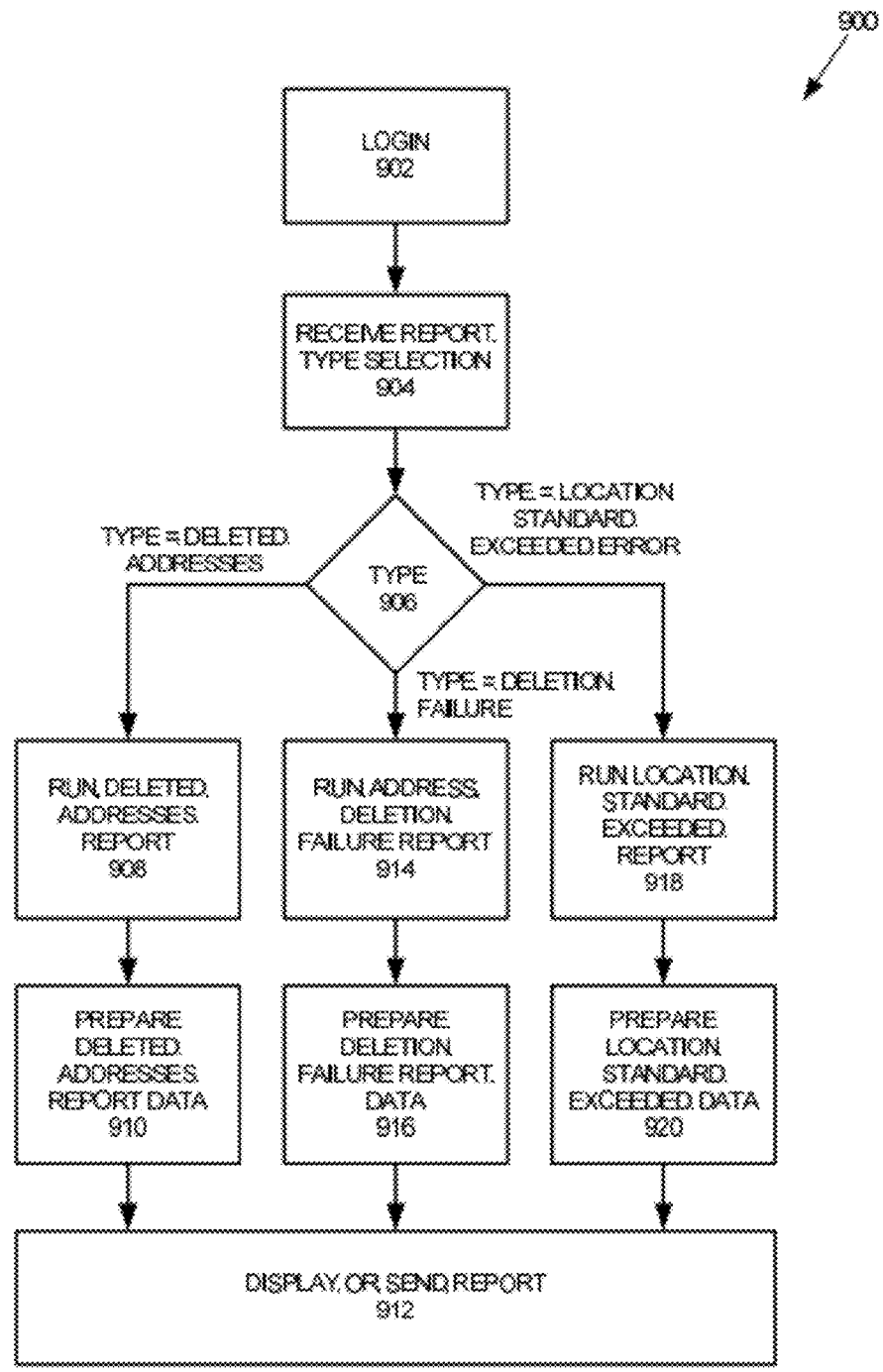
FIG. 9 is a flow diagram of an exemplary process that is associated with reporting address corrections via the ARC system of FIG. 4.

FIG. 9 is a flow diagram of an exemplary process 900 that is associated with reporting address corrections via ARC system 304. In one implementation, logic for the reporting may be implemented in telephone address system 412. However, ARC system 304 may make some of the logic in telephone address system 412 available to users via a user interface (e.g., a web interface) over portal 402, ARC manager, and/or workflow engine 410.

Process 900 may begin with a user logging into ARC system 304, with appropriate privileges to generate a report and forward the report to a network destination (e.g., an email address, network address, etc.) associated with the program for auto-creating addresses (block 902). For example, in one implementation, the user may login with a system permission to view/run reports on sub-location addresses, including error reports, reports on deleted addresses, and reports on system/user attempts to generate addresses that do not conform to established standards. Thereafter, the user may view or run the reports.

At block 904, telephone address system 412 may receive, from the user (e.g., via a client application, portal 402, ARC manager 404, etc.), a selection of a report type (block 904). If the selected type is "DELETED ADDRESSES" (block 906, TYPE=DELETED ADDRESSES), telephone address system 412 may run a deleted address report (block 908). In running the deleted address report, telephone address system 412 may prepare and include deleted address data in the report (e.g., a list of deleted addresses, the time of deletion, etc.) (block 910). At block 912, telephone address system 412 may send the report to the user (e.g., email the report) or display the report to the user via ARC manager 404 and portal 402.

Returning to block 906, if the selected type is "DELETION FAILURE" (block 906, TYPE=DELETION FAILURE), telephone address system 412 may run an address deletion failure report (block 914). Telephone address system 412 may prepare and include, in the report, data relevant to failed deletions, such as a list of sub-location addresses not deleted from telephone address database 414, the reasons for the failures, etc. (block 916). Telephone address system 412 may display and/or send the report to the user (block 912).

Returning to block 906, if the selected type is "LOCATION STANDARD EXCEEDED" (block 906, TYPE=LOCATION STANDARD EXCEEDED), telephone address system 412 may run a report on occurrences of user attempts to create a sub-location address that does not conform to an existing format or standard (block 918). Telephone address system 412 may prepare and include, in the report, descriptions of the occurrences of failed attempts to create non-standard sub-location addresses (block 920). Telephone address system 412 may also run a report to find addresses that do not have standards defined or addresses that do not conform to an existing standard. Thereafter, telephone address system 412 may display and/or send the report to the user (block 912).

In some implementations, instead of obtaining a report that pertains to one of the types shown in FIG. 9 at block 906, user 400 may generate and/or view other types of information, such as a job history in workflow database 406, address corrections, and/or other information in workflow database 406. These data may be viewed by date range, address or address range, geographical regions, correction type, user ID, customer name, etc.

In the above description, ARC system 304 may automate receiving, processing, and correcting customer addresses. As illustrated in FIG. 1, manual processing of addresses may include one or more groups or departments following procedures for messages for inputting addresses, approving addresses, validating that the addresses are 911 addresses, etc. ARC system 304 may automate workflows that are associated with these processes, as described above with respect to FIG. 3 through FIG. 9.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, when a user receives an emergency address creation/change request through phone calls, the user may attach a transcript of the conversation or any other data/information to a request for address change/creation to ARC system 404. The attached transcript, data, or information may be routed along with other information (e.g., approved address, 911 valid address, etc.) through different groups, personnel, etc., by ARC system 304 for processing the addresses.

In another example, while series of acts/blocks have been described with one or more flow diagrams, the order of acts/blocks may be varied in other implementations. Moreover, non-dependent acts/blocks may be implemented in parallel. In addition, while two types of addresses (e.g., basic address and sub-location address) have been discussed above, in other implementations, other types of addresses may be reconciled (e.g., a basic address and an address that includes additional, less, or different information (e.g., an address without a zip code, etc.).

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
    receiving, by at least one processing system, a request to process an address corresponding to a physical location;
    inserting, in a job queue by the at least one processing system, a first description of a first job for creating a first sub-location address based on a determination that the physical location corresponds to an address stored in a database;
    determining whether a formatting standard is established for creating a new sub-location address corresponding to the stored address;

performing, by the at least one processing system and based on results of the determining, subtasks of the first job for creating the first sub-location address in the database in accordance with the first description, wherein performing the subtasks includes sending a request to a second user to determine whether the sub-location address is 911 valid; and removing, by at least one processing system and responsive to the performing the subtasks, the first job description from the job queue.

2. The computer-implemented method of claim 1, wherein performing the subtasks includes:

sending a request to a first user to input the sub-location address in accordance with the established formatting standard.

3. The computer-implemented method of claim 1, wherein performing the subtasks includes:

sending the 911 valid address to a telephone address system configured to store the 911 valid address in a telephone address database.

4. The computer-implemented method of claim 1, further comprising:

receiving a request to generate a report with respect to the processing of the address; and generating, responsive to the request, the report.

5. The computer-implemented method of claim 1, further comprising:

receiving another request to establish the formatting standard for creating a new sub-location address; and establishing, responsive to the other request, to the formatting standard.

6. The computer-implemented method of claim 1, further comprising:

notifying a user associated with the request whether the sub-location address is to be created and added to the database.

7. The computer-implemented method of claim 1, further comprising:

inserting in the job queue, a second description of a second job for correcting a second sub-location address, wherein the request is further to correct an existing sub-location address stored in the database and corresponding to the physical location.

8. The computer-implemented method of claim 7, wherein correcting the second sub-location address includes deleting the second sub-location address from the database.

9. A system comprising:

one or more network devices including:

an address database storing a plurality of addresses including sub-location addresses;

a workflow database to queue job descriptions related to address processing related to one or more of the stored addresses;

an address request and creation manager, configured to:

receive a request to create a first sub-location address corresponding to a physical location, create, responsive to receiving the request, a description of a job for creating the first sub-location address in response to a determination that the physical location corresponds to the one or more of the stored addresses, and insert the job description in the workflow database in response to a determination whether the address request and creation manager defines a formatting standard for creating a new sub-location address corresponding to the one stored address; and a workflow engine, configured to:

poll the workflow database for the job description, create, responsive to the poll, the first sub-location address in accordance with the job description, wherein when the workflow engine creates the first sub-location address, the workflow engine is further configured to determine whether the first sub-location address is 911 valid, and remove, responsive to the creating, the job description from the workflow database.

10. The system of claim 9, wherein the address request and creation manager is further configured to:

provide an authentication challenge to a user related to the request; and authenticate the user based on user input received in response to the authentication challenge.

11. The system of claim 9, wherein when the workflow engine creates the first sub-location address, the workflow engine is further configured to:

request a user to input an address corresponding to the physical address.

12. The system of claim 9, further comprising a telephone address system, wherein when the workflow engine creates the first sub-location address, the workflow engine is further configured to request the telephone address system to store the first sub-location address in the address database.

13. The system of claim 12, wherein the telephone address system is further configured to:

generate a report related to the address processing related to the one or more of the stored addresses.

14. The system of claim 12, wherein the telephone address system is configured to correct a stored sub-location address corresponding to the physical location upon receiving another request to correct the one stored sub-location address via the address request and creation manager.

15. The system of claim 12, wherein the telephone address system is further configured to:

remove a stored sub-location address corresponding to the physical location.

16. The system of claim 9, wherein the job description includes a unique job identifier related to a user account associated with the physical location.

17. At least one non-transitory computer-readable medium, the computer-readable medium including computer-executable instructions for causing at least one processor to:

receive a request to create a first sub-location address corresponding to a physical location associated with a user account;

create a job description for creating the first sub-location address in response to a determination that the physical location corresponds to an address stored in a database;

insert the job description in a workflow database based on a determination that a formatting standard exists for creating a new sub-location address corresponding to the stored address;

poll, responsive to the inserting, the workflow database for the job description;

create, responsive to the polling, the first sub-location address in accordance with the job description, and determine whether the first sub-location address is 911 valid; and remove, responsive to the creating, the job description from the workflow database.

18. The at least one computer-readable medium of claim 17, further comprising computer-executable instructions for causing the at least one processor to:
    determine that multiple sub-locations are stored in association with the user account;
    create a second job description for correcting one of the stored sub-locations; and
    insert the second job description in the workflow database.

\* \* \* \* \*